(12) United States Patent
Santhanam et al.

(10) Patent No.: US 12,185,137 B2
(45) Date of Patent: Dec. 31, 2024

(54) METHODS AND APPARATUSES FOR CELL MEASUREMENTS

(71) Applicant: QUALCOMM Incorporated, San Diego, CA (US)

(72) Inventors: Arvind Vardarajan Santhanam, San Diego, CA (US); Thawatt Gopal, San Diego, CA (US); Vishal Hingorani, San Diego, CA (US); Sumit Kumar Singh, San Marcos, CA (US); Xiaoning Lu, San Diego, CA (US); Bhupesh Manoharlal Umatt, Poway, CA (US); Nitin Pant, San Diego, CA (US); Kunal Srivastava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/376,092

(22) Filed: Jul. 14, 2021

(65) Prior Publication Data

US 2022/0022069 A1     Jan. 20, 2022

Related U.S. Application Data

(60) Provisional application No. 63/052,790, filed on Jul. 16, 2020, provisional application No. 63/052,454, filed on Jul. 15, 2020.

(51) Int. Cl.
*H04W 24/08*       (2009.01)

(52) U.S. Cl.
CPC .................. *H04W 24/08* (2013.01)

(58) Field of Classification Search
None
See application file for complete search history.

(56) References Cited

U.S. PATENT DOCUMENTS

| | | | | |
|---|---|---|---|---|
| 8,923,865 | B2 * | 12/2014 | Wang ................ | H04W 36/0085 455/436 |
| 2012/0250562 | A1 * | 10/2012 | Li ........................ | H04W 24/10 370/252 |
| 2013/0010631 | A1 * | 1/2013 | Jung ...................... | H04W 16/18 370/252 |
| 2013/0244657 | A1 * | 9/2013 | Wang .................. | H04W 36/144 455/436 |

(Continued)

FOREIGN PATENT DOCUMENTS

CN       103402176 A     11/2013

OTHER PUBLICATIONS

Partial International Search Report—PCT/US2021/041786—ISA/EPO—Nov. 23, 2021.

(Continued)

*Primary Examiner* — Christopher T Wyllie
(74) *Attorney, Agent, or Firm* — Dalei Dong; Patterson & Sheridan LLP

(57) ABSTRACT

Aspects of the present disclosure provide a method for wireless communications by a user equipment (UE). The method generally includes receiving a measurement configuration, wherein the measurement configuration indicates at least one or more frequency bands, determining, based on one or more parameters, a periodicity for measuring the at least one or more frequency bands, and performing measurements of the at least one or more frequency bands according to the determined periodicity.

27 Claims, 9 Drawing Sheets

(56) References Cited

U.S. PATENT DOCUMENTS

| | | | |
|---|---|---|---|
| 2013/0308481 A1 | 11/2013 | Kazmi et al. | |
| 2015/0119037 A1 | 4/2015 | Gopal et al. | |
| 2015/0350976 A1* | 12/2015 | Kodali | H04W 76/28 |
| | | | 455/440 |
| 2016/0119797 A1* | 4/2016 | Das | H04W 24/08 |
| | | | 370/252 |
| 2017/0311266 A1* | 10/2017 | Yang | H04W 52/0254 |
| 2019/0223065 A1* | 7/2019 | Lu | H04L 5/0048 |
| 2019/0254110 A1 | 8/2019 | He et al. | |
| 2022/0022069 A1* | 1/2022 | Santhanam | H04W 52/0241 |
| 2023/0067908 A1* | 3/2023 | Zhu | H04B 7/0814 |
| 2023/0224747 A1* | 7/2023 | Xu | H04W 8/22 |
| | | | 370/329 |
| 2023/0269719 A1* | 8/2023 | Dimou | H04L 1/1864 |
| | | | 370/329 |
| 2023/0283308 A1* | 9/2023 | Goodman | H04W 24/06 |
| | | | 370/488 |

OTHER PUBLICATIONS

International Search Report and Written Opinion—PCT/US2021/041786—ISA/EPO—Jan. 13, 2022.

* cited by examiner

METHODS AND APPARATUSES FOR CELL MEASUREMENTS

PRIORITY CLAIM(S)

This application claims benefit of and priority to U.S. Provisional Application No. 63/052,454, filed on Jul. 15, 2020, and U.S. Provisional Application No. 63/052,790, filed on Jul. 16, 2020, both of which are expressly incorporated by reference in their entirety as fully set forth below and for all applicable purposes.

TECHNICAL FIELD

Aspects of the present disclosure relate to wireless communications, and more particularly, to techniques that may help improve power efficiency by controlling periodicities/rates for performing cell searches and measurements.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A UE may be configured to perform measurements on various frequencies configured by a base station for various purposes. For example, the UE may perform a cell search by measuring and evaluating synchronization signals to detect cells. Once cells are detected, the UE may perform cell measurements for cell selection or re-selection purposes.

SUMMARY

The systems, methods, and devices of the disclosure each have several innovative aspects, no single one of which is solely responsible for the desirable attributes.

Certain aspects of the subject matter described in this disclosure can be implemented in a method for wireless communication by a user equipment (UE). The method generally includes receiving a measurement configuration, wherein the measurement configuration indicates at least one or more frequencies, determining, based on one or more parameters, a periodicity for measuring the at least one or more frequencies, and performing measurements of the at least one or more frequencies according to the determined periodicity.

According to certain aspects, the one or more parameters include whether a cell was detected on one of the at least one or more frequencies within a time period and wherein determining a periodicity comprises increasing a periodicity for measuring the at least one or more frequencies if no cell was detected on the at least one or more frequencies in the period of time. According to certain aspects, determining a periodicity further comprises decreasing the periodicity for performing measurements on the at least one or more frequencies if a cell was detected on the at least one or more frequencies in the period of time.

According to certain aspects, the one or more parameters includes whether a measurement of a signal quality metric for a strongest cell, as determined based on the signal quality metric, in the at least one or more frequencies within a time period is less than a threshold and wherein determining a periodicity comprises increasing a periodicity for performing measurements on the at least one or more frequencies if the measurements for the strongest cell were less than the threshold for the period of time. According to certain aspects, determining a periodicity further comprises decreasing the periodicity for performing measurements on the at least one or more frequencies if the measurements for the strongest cell were at or above the threshold for the period of time.

According to certain aspects, at least one of the parameters includes at least one of: a charging state or the UE, a battery level of the UE, a display state of the UE, or a performance mode indicated by a user.

According to certain aspects, at least one of the parameters includes at least one of: traffic activity of the UE, input from one or more sensors of the UE indicating motion or lack of motion of the UE.

According to certain aspects, at least one of the parameters includes at least one of historical measurement data in a cell associated with the one or more frequencies or a physical location of the UE.

According to certain aspects, the method further comprises determining the physical location of the UE based on triangulation of reference signal measurements, basic service set ID (BSSID) based location determination, or global positioning system (GPS) input and a-priori information regarding cell coverage associated with the physical location.

According to certain aspects, at least one of the parameters includes at least one of: a baseband capability or a radio frequency (RF) capability of the UE; or whether measurements are performed for an asynchronous cell search or a synchronous cell search.

According to certain aspects, determining a periodicity comprises scheduling measurements concurrently on one of more of the frequencies.

According to certain aspects, the measurement configuration is received via a first radio access technology (RAT); and the measurement configuration indicates the one or more frequencies associated with a second RAT.

According to certain aspects, the measurement configuration includes a measurement gap.

According to certain aspects, the first RAT comprises a long term evolution (LTE) RAT and the second RAT comprises a new radio (NR) RAT.

According to certain aspects, the measurements are performed in millimeter wave (mmW) frequencies.

According to certain aspects, the method further includes identifying a first set of frequencies having a first periodicity of measurement; and identifying a second set of frequencies having a second periodicity of measurement; wherein determining a periodicity comprises moving a frequency from the first set to the second set or from the second set to the first set. According to certain aspects, the first periodicity is shorter than the second periodicity. According to certain aspects, within at least one of the first set or second set, at least some frequencies are determined for measurement at different periodicities. According to certain aspects, the first set comprises an active set of frequencies for cell search; and the second set comprises a dormant set of frequencies for cell search. According to certain aspects, a frequency is moved from the dormant set to the active set based on cell detection in that frequency. According to certain aspects, the first set comprises an active set of frequencies for cell measurement; and the second set comprises a dormant set of frequencies for cell measurement. According to certain aspects, a frequency is moved from the dormant set to the active set based on cell measurement in that frequency satisfying one or more threshold criteria.

Certain aspects of the subject matter described in this disclosure can be implemented in an apparatus for wireless communication by a UE. The apparatus generally includes a memory and at least one processor coupled to the memory, the memory and the at least one processor being configured to receive a measurement configuration, wherein the measurement configuration indicates at least one or more frequencies, determine, based on one or more parameters, a periodicity for measuring the at least one or more frequencies, and perform measurements of the at least one or more frequencies according to the determined periodicity.

Certain aspects of the subject matter described in this disclosure can be implemented in an apparatus for wireless communication by a UE. The apparatus generally includes means for receiving a measurement configuration, wherein the measurement configuration indicates at least one or more frequencies, means for determining, based on one or more parameters, a periodicity for measuring the at least one or more frequencies, and means for performing measurements of the at least one or more frequencies according to the determined periodicity.

Certain aspects of the subject matter described in this disclosure can be implemented in a computer readable medium having instructions stored thereon for receiving a measurement configuration, wherein the measurement configuration indicates at least one or more frequencies, determining, based on one or more parameters, a periodicity for measuring the at least one or more frequencies, and performing measurements of the at least one or more frequencies according to the determined periodicity.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to improving power use for cell search and cell measurements performed on certain frequencies. As will be described in further detail herein, the rate (or periodicity) of measurements may be controlled based on certain conditions or parameters.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
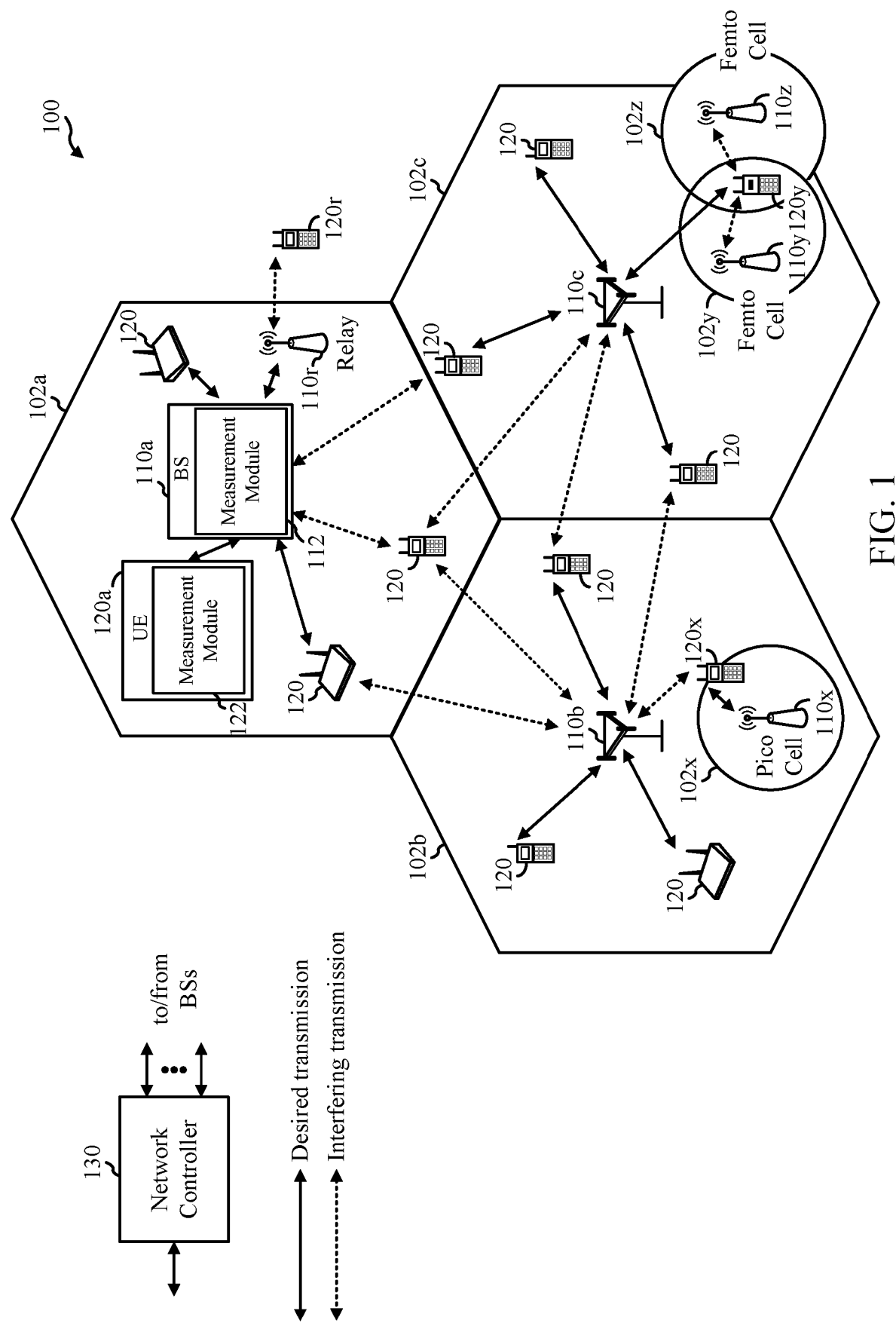
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a measurement module 122 that may be configured to perform (or cause the UE 120a to perform) operations 400 of FIG. 4.

NR access (for example, 5G NR) may support various wireless communication services, such as enhanced mobile broadband (eMBB) targeting wide bandwidth (for example, 80 MHz or beyond), millimeter wave (mmW) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120a or collectively as UEs 120) in the wireless communication network 100. The UEs 120 (for example, 120x, 120y, etc.) may be dispersed throughout the wireless communication network 100, and each UE 120a may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120a or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
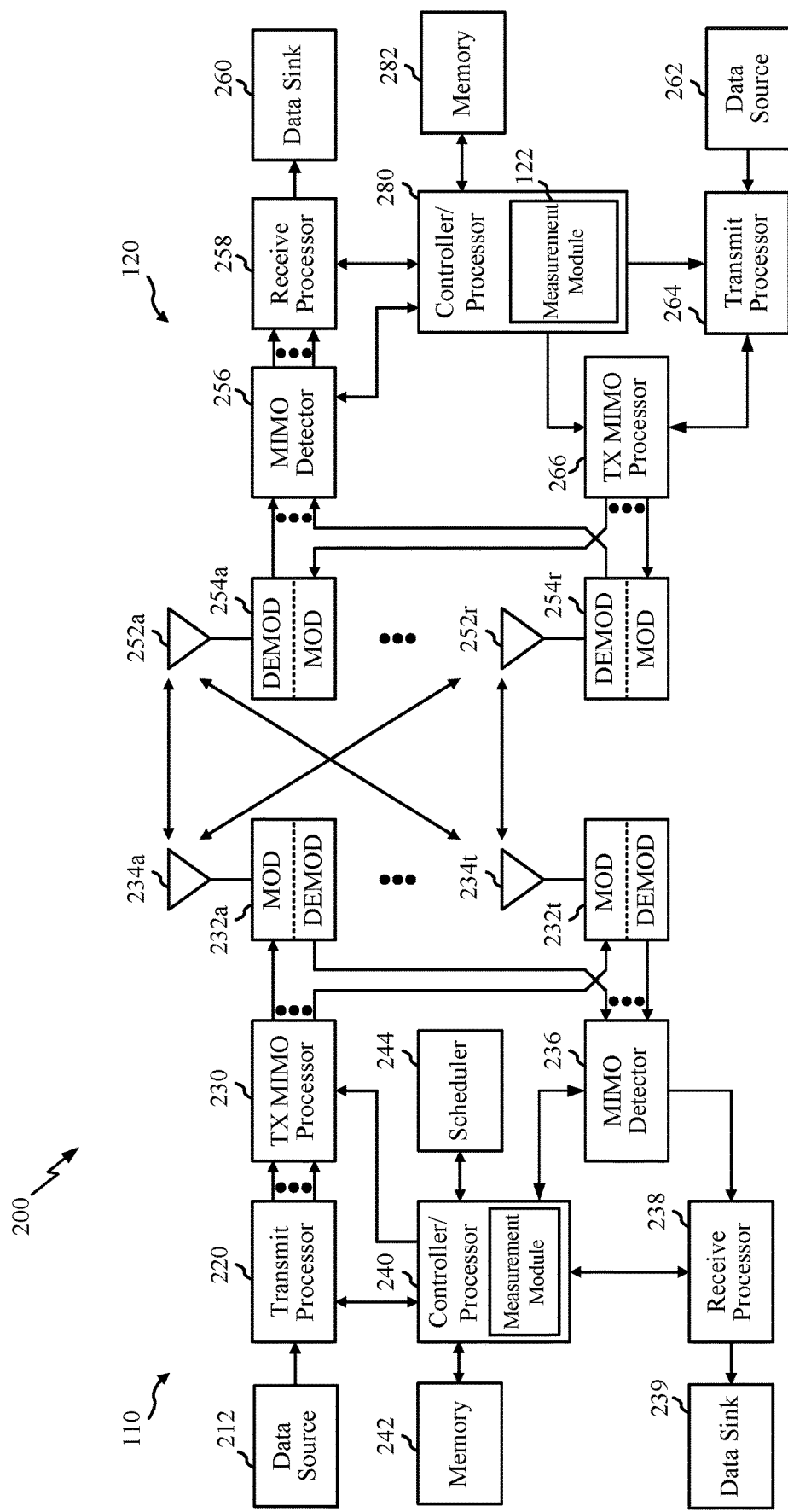
FIG. 2 shows a block diagram illustrating an example base station (BS) and an example user equipment (UE) in accordance with some aspects of the present disclosure.

FIG. 2 shows a block diagram illustrating components of an example base station (BS) and an example UE in accordance with some aspects of the present disclosure. For example, as shown in FIG. 1, UE 120a may have a controller/processor 280 with a measurement module 122 configured to perform (or cause the UE 120a to perform) operations 400 of FIG. 4.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110 and UE 120a, respectively. A scheduler 244 may schedule UEs for data transmission on the downlink or uplink.

The controller/processor 280 or other processors and modules at the UE 120a may perform or direct the execution of processes for the techniques described herein. As noted above, the controller/processor 280 of the UE 120 has a measurement module 122 that may be configured to perform (or cause the UE 120a to perform) operations 400 of FIG. 4.

Figure 3A:
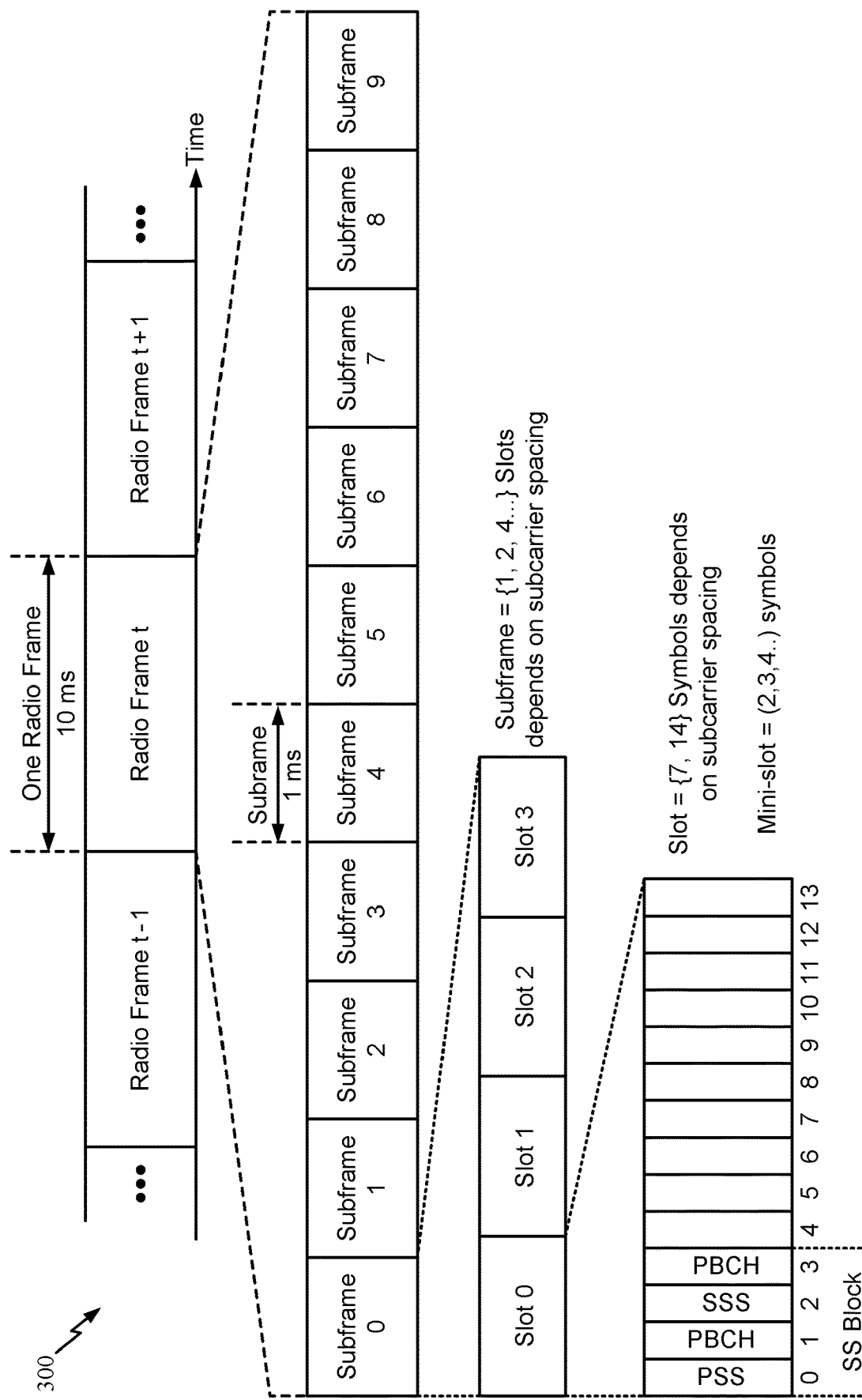
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
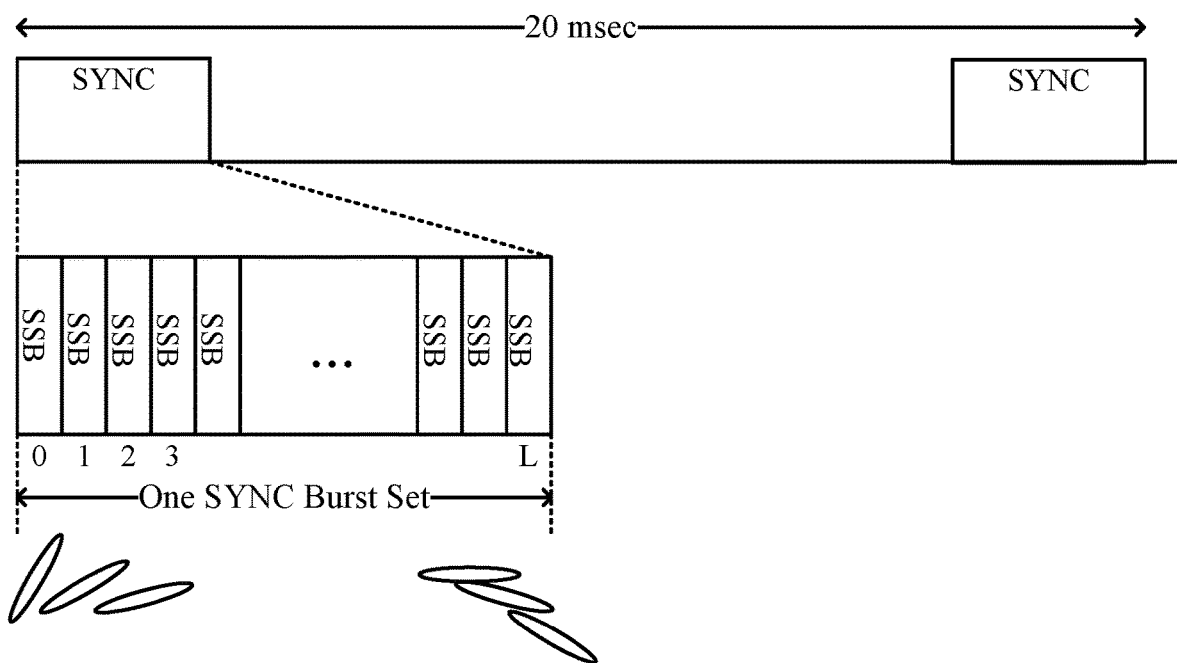
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Example Adjustments to Cell Measurements

Aspects of the present disclosure relate to wireless communications, and more particularly, to techniques for adjusting rates (or periodicities) for performing measurements by a user equipment (UE) on certain frequencies, such as when performing a cell search to detect cells and/or when performing cell measurements of detected cells. The measurement periodicities/rates for certain frequencies may be adjusted based on various factors (or parameters), such as whether a cell has been (recently) detected on a frequency in a period of time or based on a UE location.

By varying the measurement periodicities/rates of different frequencies based on various parameters, the UE may reduce power consumption. For example, the techniques presented herein may be applied for frequency measurements in various frequency ranges (FRs) utilized for new radio (NR), such as FR4 (e.g., 52.6 GHz-114.25 GHz) and FR2 (24.25 GHz to 52.6 GHz). Frequency ranges in this millimeter wave (mmW) range have shorter range but higher available bandwidth than bands in the FR1 (sub-6 GHz frequency bands).

Some UE measurement procedures may consume a significant amount of power. For example, conventional medium access control (MAC) layer (layer 2 or L2) NR inter-radio access technology (RAT) measurements for mmW cells may include numerous measurements on many frequencies, which may take a significant amount of time and processing resources. As a result, UE battery life may be significantly reduced if the UE performs such numerous measurements.

In various aspects of the present disclosure, the periodicity/rates of measurements on different (e.g., mmW) frequencies may be controlled (e.g., reduced), for example, when the UE does not have much, if any, traffic, and/or the UE is not in the vicinity of mmW coverage.

Accordingly, certain aspects of the present disclosure provide techniques for effectively determining intra-frequency, inter-frequency, and/or inter-RAT measurements in a manner designed to reduce power consumption with relatively little impact on performance. For example, the techniques presented herein may help reduce transition time from long term evolution (LTE) to enhanced universal mobile telecommunications system (UMTS) radio access network (E-UTRAN) New Radio Dual Connectivity (ENDC) (e.g., LTE+mmW) without compromising on power consumption.

As will be described herein, when conditions permit, and/or based at least in part on one or more parameters, the rate/periodicity of NR mmW measurements may be adjusted (e.g., reducing the rate and increasing the periodicity, or increasing the rate and reducing the periodicity) to reduce power consumption. As used herein, "adjusting" a measurement rate/periodicity may be understood to increase or decrease the measurement rate (or decreasing or increasing the measurement periodicity). Measurement rate and periodicity may be inversely proportional, such that reducing measurement periodicity (reducing the period between measurements) increases the measurement rate, while increasing periodicity (increasing the period between measurements) decreases the measurement rate.

The techniques presented herein may be applied to measurements on frequencies for the same or different RATs. For example, the techniques described herein may be applied to LTE to NR mmW transition measurements, but may also apply to ENDC to mmW transition measurements, NR standalone to mmW transition measurements, NR dual connectivity (DC) to mmW transition measurements, or any suitable wireless wide area network (WWAN) to wireless local area network (WLAN) transition measurements. Also, a target measurement frequency may be associated with frequency bands other than mmW (e.g., of a same air interface type, LTE, NR, WCDMA, and the like). In some cases, even if a the measurement configuration is on a first RAT, there may be multiple RATs as serving cells (e.g., LTE and NR in ENDC) or multiple frequency ranges in NR (e.g., FR1 and FR2 in NR DC).

Figure 4:
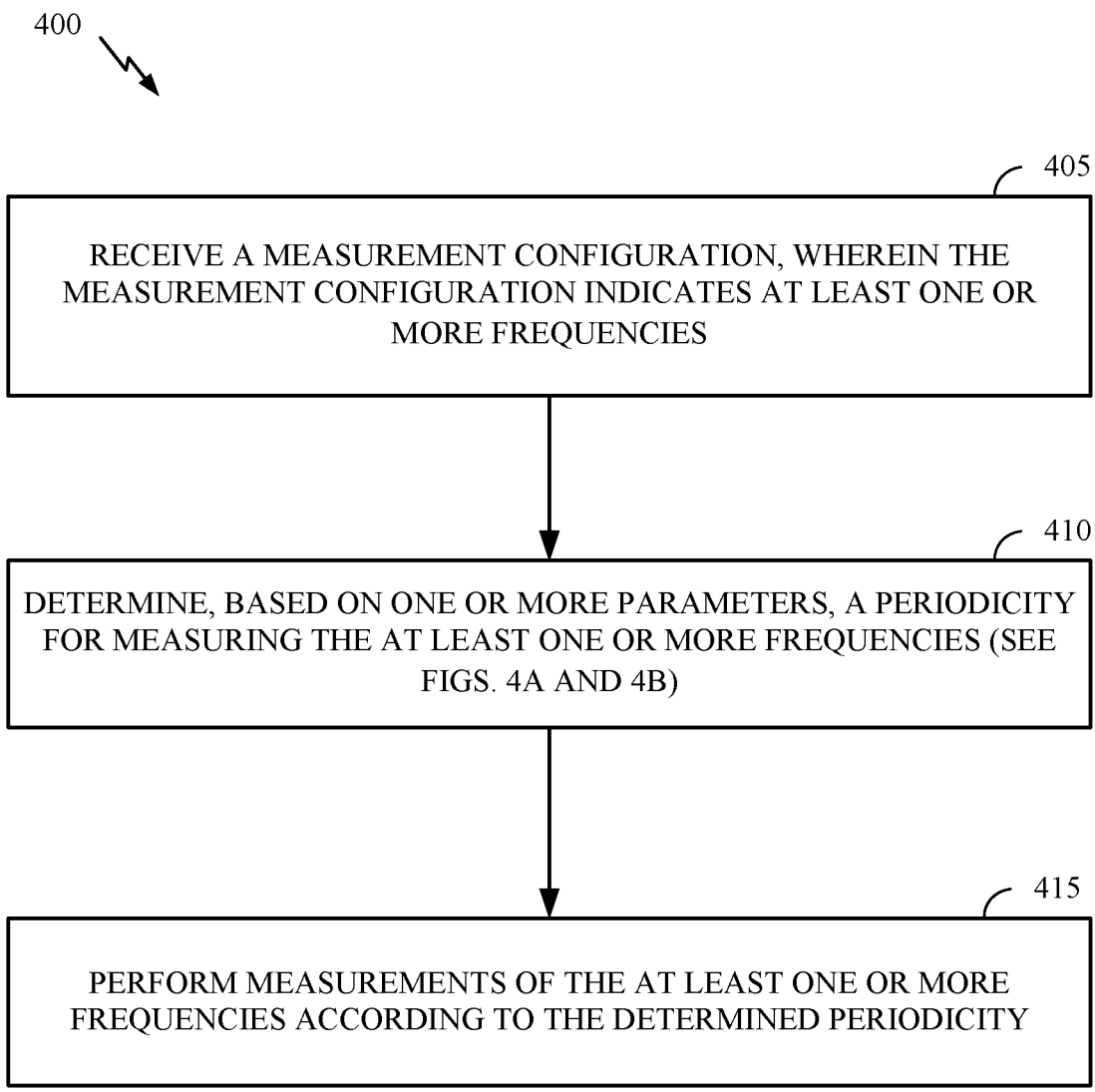
FIG. 4 illustrates example operations for wireless communication by a UE, in accordance with some aspects of the present disclosure.

FIG. 4 illustrates example operations 400 for wireless communication by a UE, in accordance with aspects of the present disclosure. For example, operations 400 may be performed by a UE 120a of FIG. 1 or 2 or performing power efficient frequency measurements, in accordance with certain aspects of the present disclosure.

Operations 400 begin, at 405, by receiving a measurement configuration, wherein the measurement configuration indicates at least one or more frequencies. At 410, the UE determines, based on one or more parameters, a periodicity for measuring the at least one or more frequencies. At 415, the UE performs measurements of the at least one or more frequencies according to the determined periodicity.

As noted above, in certain aspects, the techniques described herein may be applied to determine NR (e.g., mmW) measurements at a variable rate/periodicity to optimize power consumption.

Figure 4A:
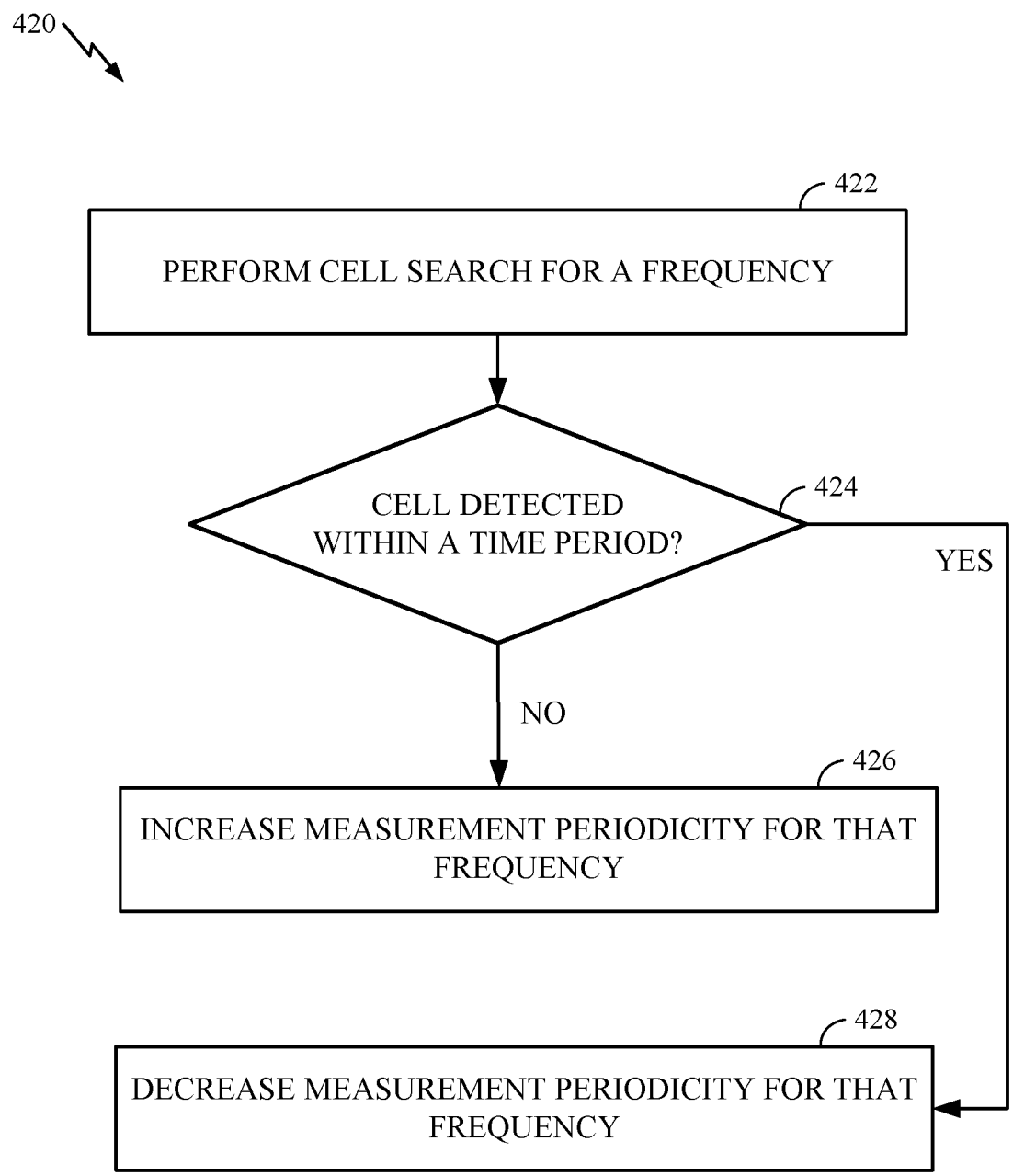
FIGS. 4A and 4B illustrate examples of determining measurement periodicities, in accordance with some aspects of the present disclosure.
Figure 4B:
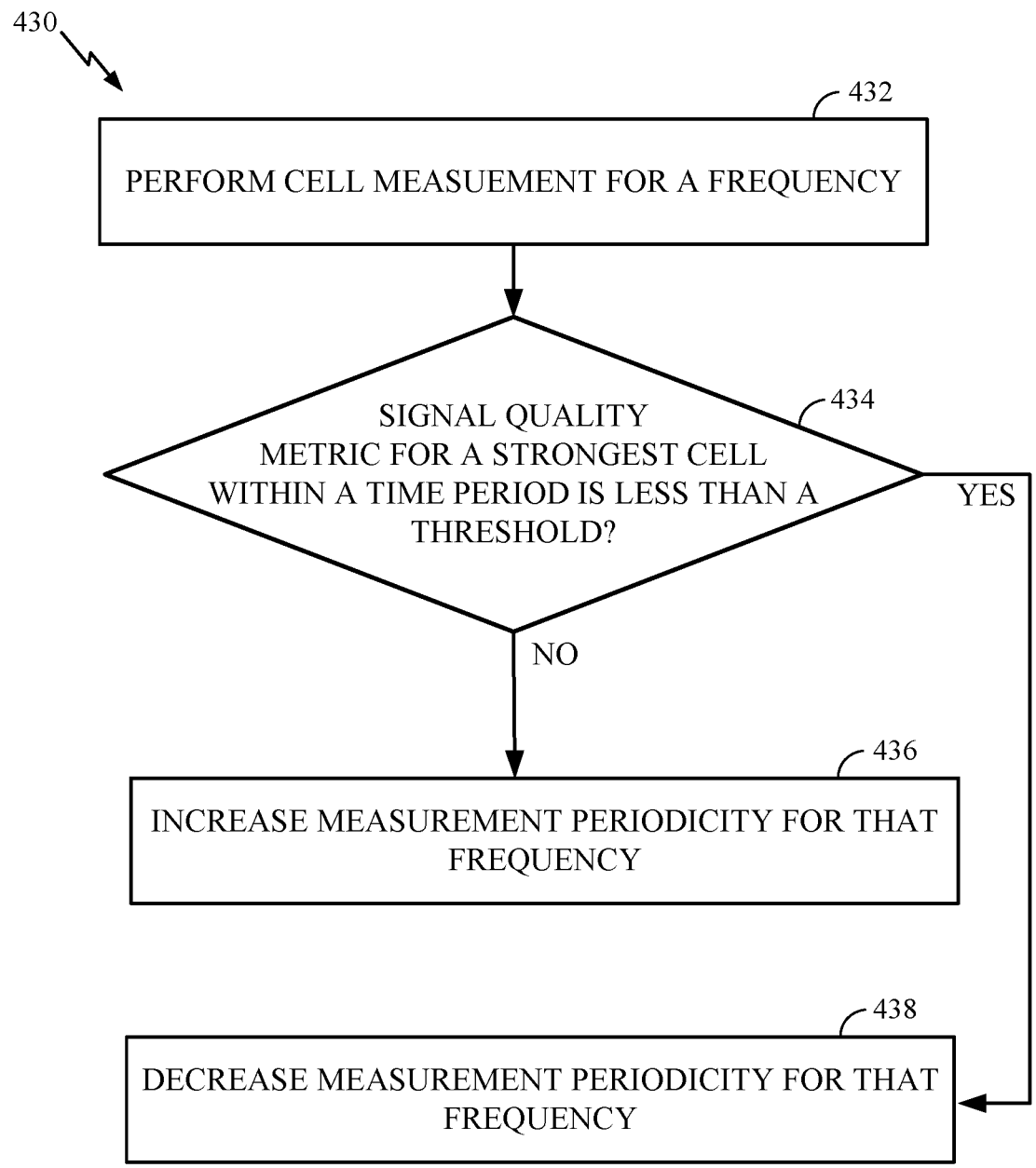

FIGS. 4A and 4B illustrate example operations 420 and 430, respectively, for determining measurement periodicities (e.g., per block 410 of FIG. 4), for cell search and cell measurements, respectively.

Referring first to operations 420 FIG. 4A, at 422, measurements are performed for a frequency. If a cell is detected within a time period (e.g., within some number of measurement periods), as determined at 424, the measurement period for that frequency is decreased, at 428 (resulting in more frequent measurements on that frequency). On the other hand, if no cell is detected on that frequency within the time period, the measurement period for that frequency is increased at 428 (resulting in less frequent measurements on that frequency).

Referring first to operations 430 FIG. 4B, at 432, measurements are performed for a frequency. If a signal quality metric for a strongest cell (as determined based on the signal quality metric) within a time period (e.g., less than a threshold), as determined at 434, the measurement period for that frequency is decreased, at 438 (resulting in more frequent measurements on that frequency). On the other hand, if no cell is detected on that frequency within the time period, the measurement period for that frequency is increased at 438 (resulting in less frequent measurements on that frequency).

For example, in accordance with the operations 420 shown in FIG. 4A, the measurement periodicity may be determined (e.g., increased) when no NR (e.g., mmW) cell is detected by the UE for a period of time (e.g., within number of N last attempts). Additionally or alternatively, in accordance with operations 430 shown in FIG. 4B, the measurement rate/periodicity may be reduced if a measurement metric for a strongest (top) cell in a particular NR mmW frequency (e.g., according to a measurement metric) is less than a differential amount (e.g., K dB) of a measurement reporting threshold in a period of time (e.g., in the last M consecutive attempts). The measurement metric may be, for example, reference signal received power (RSRP), reference signal received quality (RSRQ), and/or synchronization signal (SS) signal to interference and noise ratio (SINR).

In some cases, if one or both of the above mentioned conditions are satisfied, the UE may decrease the measurement rate. Alternatively, the UE may increase the measurement rate/periodicity if one or more of the conditions are not met.

In some cases, the UE may adjust the measurement rate/periodicity based on other factors (or parameters), such as a charging state of the UE, a battery level state (e.g., >50%), a display mode of the UE (e.g., display turned on), and/or a performance mode of the UE (e.g., as indicated/configured by a user of the UE). For example, if a UE is plugged into a charger or the battery level is high, it may not be necessary to reduce measurement rate/periodicity to conserve power. Similarly, if the display is on or a user has indicated a high performance mode, these may be considered factors where the power consumption associated with more frequent measurements may be tolerable.

In certain aspects, the UE may adjust the measurement rate/periodicity based on traffic activity and/or inertial data from at least one sensor on the UE. For example, if there is limited traffic activity or a sensor indicates little or no motion of the UE, more frequent measurements may not be helpful and the additional power consumption may be considered unjustified. Thus, in this example, the measurement rate may be reduced. In some cases, the UE may adjust the measurement rate/periodicity based on a mobility of the UE itself. In this case, the mobility may be based on a rate of change of a measured signal quality for a serving cell of the UE and/or input from one or more inertial sensors (e.g., an accelerometer) of the UE.

In certain aspects, the UE may adjust the measurement rate/periodicity based on historical data (e.g., in a particular cell). For example, the UE may determine information about a mmW cell based on other information, such as a location of the UE. The UE may determine its location (e.g., a specific physical location), for example, based on global positioning system (GPS) information, triangulation of RSRP, RSRQ, SINR, and/or positioning reference signal (PRS), or other methods, such as basic service set ID (BSSID) based location determination. The UE may adjust the measurement rate/periodicity based on the determined location and a-priori information about the location. For example, this a priori information may indicate that there is no NR (e.g., mmW) cell in the associated area. Therefore, performing cell search and/or measurement on NR frequencies may not be justified.

In certain aspects, the UE may adjust the measurement rate/periodicity by scheduling measurements on certain frequencies to be performed concurrently, based on a baseband and/or a radio frequency (RF) capability of the UE. For example, the UE may determine a measurement periodicity based at least in part on the RF capability (e.g., how many mmW frequencies can be measured within the RF bandwidth (BW) within a given power constraint (e.g., larger RF BW can incur higher power)) of the UE. In some cases, the UE may have an RF capability that allows the UE to concurrently measure multiple mmW frequencies concurrently. In such cases, periodicities of such frequencies may be determined/adjusted to allow for the concurrent measurement with relatively little impact on power consumption.

In some aspects, the UE may determine the measurement rate/periodicity based at least in part on whether the search performed is for an asynchronous cell or a synchronous cell. For example, more frequencies may be measured concurrently in a synchronous cell (e.g., relative to an asynchronous cell) due to the known timing, resulting in fewer measurement candidates. In this case, the UE may perform multiple measurements concurrently on one or more frequencies. As other cases, the UE may be able to perform one asynchronous cell search on one frequency but multiple synchronous cell searches on multiple different frequencies. In such cases, a UE may determine periodicities of such frequencies to allow for more frequent synchronous cell searches with relatively little impact on power consumption. As defined in 3GPP TS 38.133, for example, synchronous (e.g., for a synchronous handover/transition) may be understood to mean meeting conditions associated with maximum receive/transmit timing differences between a source and target cell, where failing to meet such conditions would be asynchronous (e.g., for an asynchronous handover/transition). Furthermore, it should be understood that such conditions may vary for intra-frequency, intra-band/inter-frequency, and inter-band/inter-frequency, as defined in Table 6.1.3.2-1 in 3GPP TS 38.133.

In certain aspects, the adjustment of the measurement rate/periodicity may include a configuration of a measurement gap (e.g., periods of time designed to allow a UE to perform measurements). The techniques described herein may apply to gap-based measurement or gap-less measurement (with no dedicated measurement gaps). Moreover, the techniques disclosed herein may also be applied in non-discontinuous reception (DRX) as well as connected mode DRX (CDRX) periods.

Figure 5A:
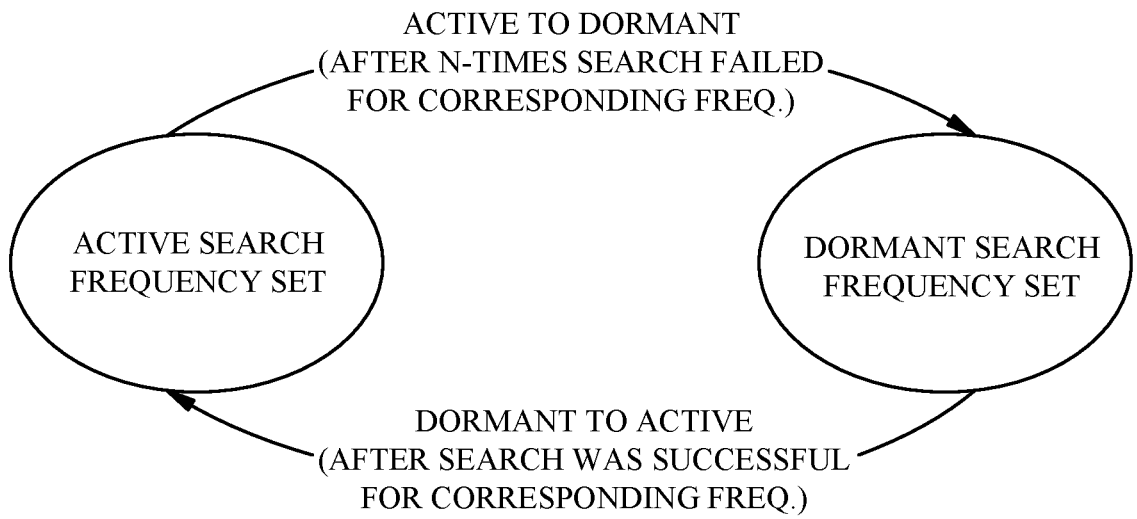
FIGS. 5A and 5B illustrate active and dormant cell search measurement frequency sets, in accordance with aspects of the present disclosure.
Figure 5B:
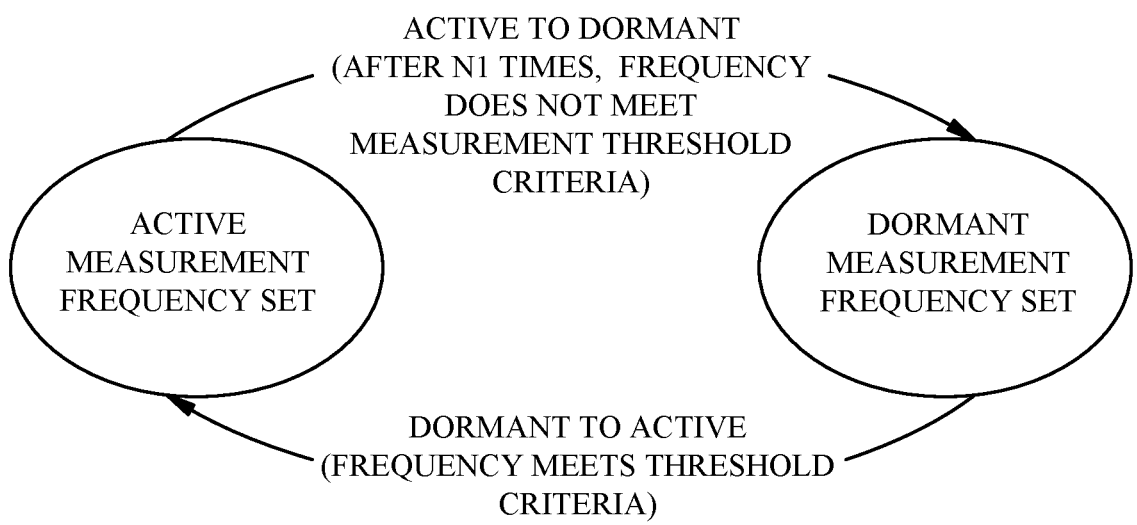

According to certain aspects, a UE may maintain two different sets of frequencies: an active set and a dormant set. The active set may include frequencies measured at a higher rate because one of the parameter-related conditions described above are met, and the dormant set may include frequencies measured at a lower rate because one of the parameter-related conditions described above are not met. As illustrated in FIG. 5A, such (active and dormant) sets may be maintained for cell searching purposes (measurements performed to detect a cell). In addition, or as an alternative, active and dormant frequency sets may be maintained for cell measurement purposes (measurements performed after cell detection), as illustrated in FIG. 5B.

For cell searching, frequencies in the active set may be measured at a faster rate (or lower periodicity), while dormant set frequencies may be measured at a slower rate. For example, frequencies in the active set may be measured at a rate/periodicity a factor of K times faster (where K>1, such as 4) than frequencies in the dormant set. This may be referred to as measurement telescoping, as the measurement periodicities may be increased or decreased, like the length of telescope when being extended or retracted.

In some cases, the UE may initialize some or all frequencies in the active set. Moreover, as shown in FIG. 5A, the UE may move frequencies from the active set to the dormant set, or from the dormant set to the active set (effectively adjusting the measurement periodicities). For example, a frequency in the active set may be moved to the dormant set if, in the last N (e.g., where N is a positive integer, such as 3) consecutive attempts, no mmW cell was detected. Conversely, a frequency in the dormant set may be moved to the active set if at least one mmW cell was detected on that particular frequency within the last N opportunities. In some cases, different conditions/parameters may be applied to move frequencies from the active set to the dormant set than are applied to the move frequencies from the dormant set to the active set.

In some cases, for frequencies within any particular set (the active set and/or dormant set), the frequencies can be measured at different periodicities. For example, the different periodicities may be based on some additional context or parameters (e.g., a likelihood of being able to detect a cell on a given frequency).

As shown in FIG. 5B, an active measurement set and a dormant measurement set may also be maintained by the UE for cell measurement purposes. For example, these sets may include the frequencies where at least one cell has been detected. Similar to above description for cell searching, the active measurement set frequencies may be determined at a faster rate/periodicity in general, while dormant measurement set frequencies may be determined at a slower rate/periodicity (e.g., a factor of K1 times the search period of an active measurement set frequency where K1>1).

In certain aspects, the UE may initialize some or all frequencies where at least one cell has been detected in the active measurement set. Similar to the above cell searching description, a frequency in the active measurement set may be moved to the dormant measurement set if, in the last N1 attempts (e.g., where N1 is a positive integer), the measurement of the cell does not meet the following measurement threshold criteria:

(1) CDRX cycle is greater than or equal to 160 ms; and/or
(2) N1 consecutive measurements of the topmost cell of a FR2 inter-frequency or inter-RAT frequency is less than a threshold decibel value.

In certain aspects, the threshold decibel value may be a threshold to start a time to trigger (TTT) and may include hysteresis configured by the network. In some examples, the UE may set the measurement rate/periodicity for FR2 measurement frequency to a factor of K1 times of a default measurement rate, where the default measurement rate/periodicity is a baseline measurement rate/periodicity of the active measurement set. In certain aspects, a frequency in the dormant measurement set may be moved to the active measurement set if in the last scheduling measurement, the measurement of the top (strongest) cell was at least greater than or equal to the threshold decibel value (e.g., 4 dB). It should be noted that for frequencies within the active measurement set, the frequencies may be measured at different periodicities based on additional context (e.g., a likelihood of being able to detect a cell on a given frequency).

By adjusting rates (or periodicities) for performing measurements by a UE on certain frequencies, such as when performing a cell search to detect cells and/or when performing cell measurements on already detected cells, techniques presented herein may help optimize UE power consumption.

Figure 6:
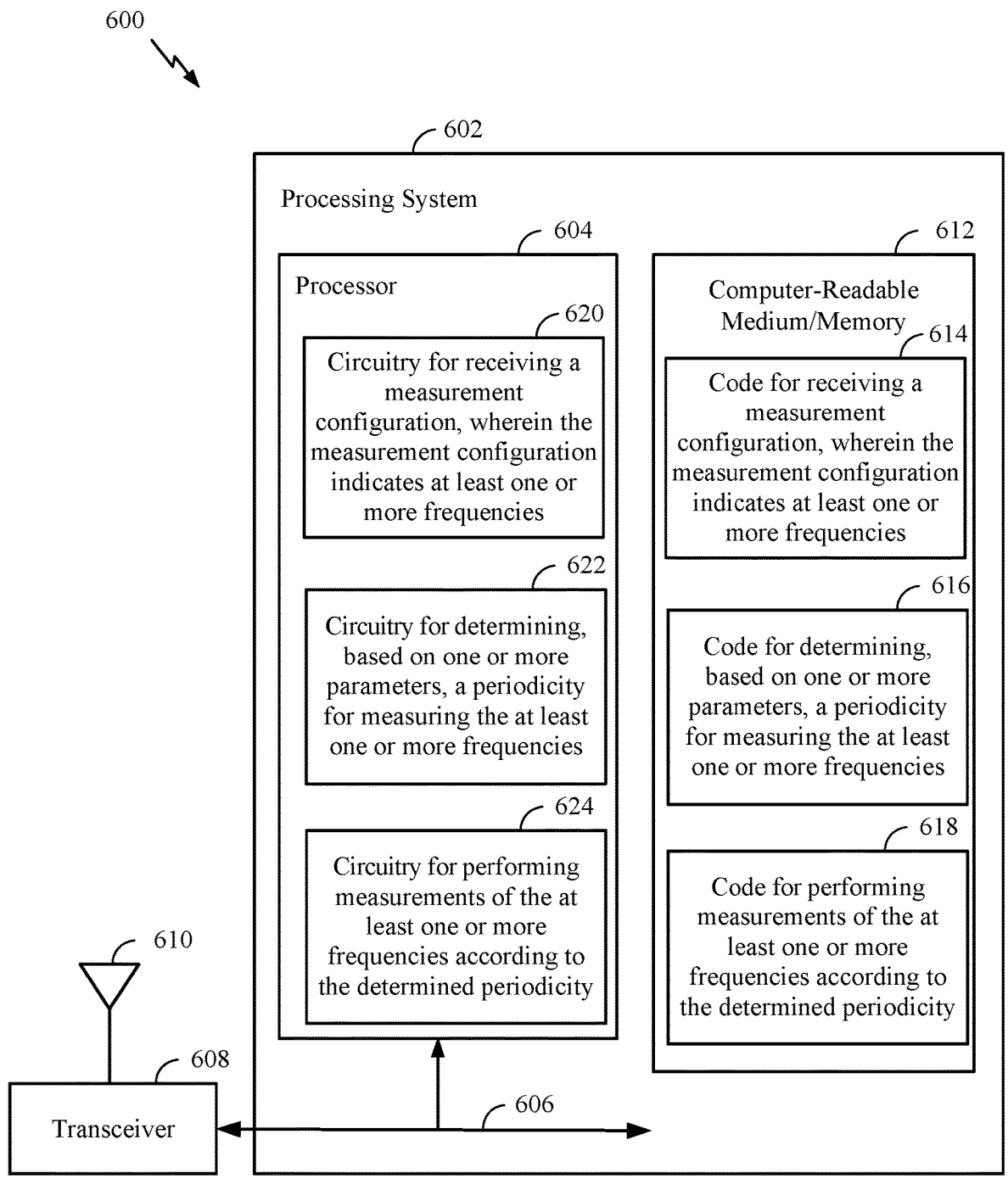
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608 (e.g., a transmitter and/or a receiver). The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4. In certain aspects, computer-readable medium/memory 612 stores code 614 for receiving a measurement configuration, wherein the measurement configuration indicates at least one or more frequencies; code 616 for determining, based on one or more parameters, a periodicity for measuring the at least one or more frequencies; and code 618 for performing measurements of the at least one or more frequencies according to the determined periodicity. In certain aspects, the processor 604 has circuitry configured to implement the code stored in the computer-readable medium/memory 612. The processor 604 includes circuitry 620 for receiving a measurement configuration, wherein the measurement configuration indicates at least one or more frequencies; circuitry 622 for determining, based on one or more parameters, a periodicity for measuring the at least one or more frequencies; and circuitry 624 for performing measurements of the at least one or more frequencies according to the determined periodicity.

Example Aspects

Implementation examples are described in the following numbered aspects:

Aspect 1. A method for wireless communications performed by a user equipment (UE), comprising: receiving a measurement configuration, wherein the measurement configuration indicates at least one or more frequencies; determining, based on one or more parameters, a periodicity for measuring the at least one or more frequencies; and performing measurements of the at least one or more frequencies according to the periodicity.

Aspect 2. The method of Aspect 1, wherein: the one or more parameters include whether a cell was detected on one of the at least one or more frequencies within a time period; and wherein determining the periodicity comprises increasing the periodicity for measuring the at least one or more frequencies if no cell was detected on the at least one or more frequencies in the time period.

Aspect 3. The method of Aspect 2, wherein determining the periodicity further comprises: decreasing the periodicity for performing measurements on the at least one or more frequencies if a cell was detected on the at least one or more frequencies in the time period.

Aspect 4. The method of any one of Aspects 1-3, wherein: the one or more parameters comprises whether a measurement of a signal quality metric for a strongest cell, as determined based on the signal quality metric, in the at least one or more frequencies within a time period is less than a threshold; and wherein determining the periodicity comprises increasing the periodicity for performing measurements on the at least one or more frequencies if the measurements for the strongest cell were less than the threshold for the time period.

Aspect 5. The method of Aspect 4, wherein determining the periodicity further comprises decreasing the periodicity for performing measurements on the at least one or more frequencies if the measurements for the strongest cell were at or above the threshold for the time period.

Aspect 6. The method of any one of Aspects 1-5, wherein at least one of the parameters comprises at least one of: a charging state or the UE: a battery level of the UE; a display state of the UE; or a performance mode indicated by a user.

Aspect 7. The method of any one of Aspects 1-6, wherein at least one of the parameters comprises at least one of: traffic activity of the UE; or input from one or more sensors of the UE indicating motion or lack of motion of the UE.

Aspect 8. The method of any one of Aspects 1-7, wherein at least one of the parameters includes a measurement of mobility of the UE based on at least one of: a rate of change of a measured signal quality for a serving cell; or input from one or more inertial sensors of the UE.

Aspect 9. The method of any one of Aspects 1-8, wherein at least one of the parameters includes at least one of historical measurement data in a cell associated with the one or more frequencies or a physical location of the UE.

Aspect 10. The method of Aspect 9, further comprising determining the physical location of the UE based on triangulation of reference signal measurements, basic service set ID (BSSID) based location determination, or global positioning system (GPS) input and a-priori information regarding cell coverage associated with the physical location.

Aspect 11. The method of any one of Aspects 1-10, wherein at least one of the parameters includes at least one of: a baseband capability or a radio frequency (RF) capability of the UE; or whether measurements are performed for an asynchronous cell search or a synchronous cell search.

Aspect 12. The method of Aspect 11, wherein determining a periodicity comprises scheduling measurements concurrently on one of more of the frequencies.

Aspect 13. The method of any one of Aspects 1-13, wherein: the measurement configuration is received via a first radio access technology (RAT); and the measurement configuration indicates the one or more frequencies associated with a second RAT.

Aspect 14. The method of Aspect 13, wherein the measurement configuration includes a measurement gap.

Aspect 15. The method of Aspect 13, wherein: the first RAT comprises a long term evolution (LTE) RAT; and the second RAT comprises a new radio (NR) RAT.

Aspect 16. The method of Aspect 13, wherein: the first RAT comprises a wireless local area network (WLAN) RAT; and the second RAT comprises a wireless wide area network (WWAN) RAT.

Aspect 17. The method of Aspect 13, wherein performing measurements comprises performing measurements in millimeter wave (mmW) frequencies.

Aspect 18. The method of any one of Aspects 1-17, further comprising:
identifying a first set of frequencies having a first periodicity of measurement; and identifying a second set of frequencies having a second periodicity of measurement, wherein determining the periodicity comprises moving a frequency from the first set of frequencies to the second set of frequencies or from the second set of frequencies to the first set of frequencies.

Aspect 19. The method of Aspect 18, wherein the first periodicity of measurement is shorter than the second periodicity of measurement.

Aspect 20. The method of Aspect 18, wherein, within at least one of the first set of frequencies or the second set of frequencies, at least some frequencies are determined for measurement at different periodicities.

Aspect 21. The method of Aspect 18, wherein: the first set of frequencies comprises an active set of frequencies for cell search; and the second set of frequencies comprises a dormant set of frequencies for cell search.

Aspect 22. The method of Aspect 21, wherein a frequency is moved from the dormant set of frequencies to the active set of frequencies based on a cell detection in that frequency.

Aspect 23. The method of Aspect 18, wherein: the first set of frequencies comprises an active set of frequencies for cell measurement; and the second set of frequencies comprises a dormant set of frequencies for cell measurement.

Aspect 24. The method of Aspect 23, wherein a frequency is moved from the dormant set of frequencies to the active set of frequencies based on cell measurement in that frequency satisfying one or more threshold criteria.

Aspect 25: An apparatus for wireless communications, comprising means for performing the method of any one or more of Aspects 1-24.

Aspect 26: An apparatus for wireless communications, comprising a memory and a processor coupled with the memory, the memory and the processor configured to perform the Aspect of any one or more of Aspects 1-24.

Aspect 27: A computer-readable medium having instructions stored thereon which, when executed by a processor, performs the method of any one or more of Aspects 1-24.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 4 may be performed by various processors shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120*a* (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communications performed by a user equipment (UE), comprising:
   receiving a measurement configuration, wherein the measurement configuration indicates at least one or more frequencies;
   determining, based on one or more parameters, a periodicity for measuring the at least one or more frequencies, wherein the one or more parameters include whether a cell was detected on one of the at least one or more frequencies within a first number of cell detection attempts and data traffic activity at the UE, wherein determining the periodicity comprises increasing the periodicity when no cell is detected on the one of the at least one or more frequencies within the first number of cell detection attempts and the data traffic activity at the UE is more than a threshold, and decreasing the periodicity when at least one cell is detected on the one of the at least one or more frequencies within the first number of cell detection attempts and the data traffic activity at the UE is less than or equal to the threshold, and wherein the first number is equal to or greater than one; and performing measurements of the at least one or more frequencies according to the periodicity.

2. The method of claim 1, wherein:
the one or more parameters comprises whether a measurement of a signal quality metric for a strongest cell, as determined based on the signal quality metric, in the at least one or more frequencies within a time period is less than a threshold; and
wherein determining the periodicity comprises increasing the periodicity for performing measurements on the at least one or more frequencies if the measurements for the strongest cell were less than the threshold for the time period.

3. The method of claim 2, wherein determining the periodicity further comprises decreasing the periodicity for performing measurements on the at least one or more frequencies if the measurements for the strongest cell were at or above the threshold for the time period.

4. The method of claim 1, wherein at least one of the parameters comprises at least one of:
a charging state of the UE;
a battery level of the UE;
a display state of the UE; or
a performance mode indicated by a user.

5. The method of claim 1, wherein at least one of the parameters comprises
input from one or more sensors of the UE indicating motion or lack of motion of the UE.

6. The method of claim 1, wherein at least one of the parameters includes a measurement of mobility of the UE based on at least one of:
a rate of change of a measured signal quality for a serving cell; or
input from one or more inertial sensors of the UE.

7. The method of claim 1, wherein at least one of the parameters includes at least one of historical measurement data in a cell associated with the one or more frequencies or a physical location of the UE.

8. The method of claim 7, further comprising determining the physical location of the UE based on triangulation of reference signal measurements, basic service set ID (BSSID) based location determination, or global positioning system (GPS) input and a-priori information regarding cell coverage associated with the physical location.

9. The method of claim 1, wherein at least one of the parameters includes at least one of:
a baseband capability or a radio frequency (RF) capability of the UE; or
whether measurements are performed for an asynchronous cell search or a synchronous cell search.

10. The method of claim 9, wherein determining a periodicity comprises scheduling measurements concurrently on one or more of the frequencies.

11. The method of claim 9, wherein:
the measurement configuration is received via a first radio access technology (RAT); and
the measurement configuration indicates the one or more frequencies associated with a second RAT.

12. The method of claim 11, wherein the measurement configuration includes a measurement gap.

13. The method of claim 11, wherein:
the first RAT comprises a long term evolution (LTE) RAT; and
the second RAT comprises a new radio (NR) RAT.

14. The method of claim 11, wherein:
the first RAT comprises a wireless local area network (WLAN) RAT; and
the second RAT comprises a wireless wide area network (WWAN) RAT.

15. The method of claim 11, wherein performing measurements comprises performing measurements in millimeter wave (mmW) frequencies.

16. The method of claim 1, further comprising:
identifying a first set of frequencies having a first periodicity of measurement; and
identifying a second set of frequencies having a second periodicity of measurement, wherein determining the periodicity comprises moving a frequency from the first set of frequencies to the second set of frequencies or from the second set of frequencies to the first set of frequencies.

17. The method of claim 16, wherein the first periodicity of measurement is shorter than the second periodicity of measurement.

18. The method of claim 16, wherein, within at least one of the first set of frequencies or the second set of frequencies, at least some frequencies are determined for measurement at different periodicities.

19. The method of claim 16, wherein:
the first set of frequencies comprises an active set of frequencies for cell search; and
the second set of frequencies comprises a dormant set of frequencies for cell search.

20. The method of claim 19, wherein a frequency is moved from the dormant set of frequencies to the active set of frequencies based on a cell detection in that frequency.

21. The method of claim 16, wherein:
the first set of frequencies comprises an active set of frequencies for cell measurement; and
the second set of frequencies comprises a dormant set of frequencies for cell measurement.

22. The method of claim 21, wherein a frequency is moved from the dormant set of frequencies to the active set of frequencies based on cell measurement in that frequency satisfying one or more threshold criteria.

23. An apparatus for wireless communication by a user equipment (UE), comprising:
a memory comprising instructions and one or more processors configured, individually or in any combination, to execute the instructions and cause the apparatus to:
receive a measurement configuration, wherein the measurement configuration indicates at least one or more frequencies;
determine, based on one or more parameters, a periodicity for measuring the at least one or more frequencies, wherein the one or more parameters include whether a cell was detected on one of the at least one or more frequencies within a first number of cell detection attempts and data traffic activity at the UE, wherein the periodicity is determined by increasing the periodicity when no cell is detected on the one of the at least one or more frequencies within the first number of cell detection attempts and the data traffic activity at the UE is more than a threshold, and decreasing the periodicity when at least one cell is detected on the one of the at least one or more frequencies within the first number of cell detection attempts and the data traffic activity at the UE is less than or equal to the threshold, and wherein the first number is equal to or greater than one; and perform measurements of the at least one or more frequencies according to the periodicity.

24. The apparatus of claim 23, wherein:
the one or more parameters comprises whether a measurement of a signal quality metric for a strongest cell, as determined based on the signal quality metric, in the at least one or more frequencies within a time period is less than a threshold; and
the one or more processors are further configured, individually or in any combination, to execute the instructions and cause the apparatus to determine the periodicity by increasing a periodicity for performing measurements on the at least one or more frequencies if the measurements for the strongest cell were less than the threshold for the time period.

25. The apparatus of claim 23, wherein:
the measurement configuration is received via a first radio access technology (RAT); and
the measurement configuration indicates the one or more frequencies associated with a second RAT.

26. An apparatus for wireless communication by a user equipment (UE), comprising:
means for receiving a measurement configuration, wherein the measurement configuration indicates at least one or more frequencies;
means for determining, based on one or more parameters, a periodicity for measuring the at least one or more frequencies, wherein the one or more parameters include whether a cell was detected on one of the at least one or more frequencies within a first number of cell detection attempts and data traffic activity at the UE, wherein determining the periodicity comprises increasing the periodicity when no cell is detected on the one of the at least one or more frequencies within the first number of cell detection attempts and the data traffic activity at the UE is more than a threshold, and decreasing the periodicity when at least one cell is detected on the one of the at least one or more frequencies within the first number of cell detection attempts and the data traffic activity at the UE is less than or equal to the threshold, and wherein the first number is equal to or greater than one; and
means for performing measurements of the at least one or more frequencies according to the periodicity.

27. A non-transitory computer readable medium comprising instructions that, when executed by one or more processors of a user equipment (UE) cause the UE to perform a method of wireless communications, comprising:
receiving a measurement configuration, wherein the measurement configuration indicates at least one or more frequencies;
determining, based on one or more parameters, a periodicity for measuring the at least one or more frequencies, wherein the one or more parameters include whether a cell was detected on one of the at least one or more frequencies within a first number of cell detection attempts and data traffic activity at the UE, wherein determining the periodicity comprises increasing the periodicity when no cell is detected on the one of the at least one or more frequencies within the first number of cell detection attempts and the data traffic activity at the UE is more than a threshold, and decreasing the periodicity when at least one cell is detected on the one of the at least one or more frequencies within the first number of cell detection attempts and the data traffic activity at the UE is less than or equal to the threshold, and wherein the first number is equal to or greater than one; and
performing measurements of the at least one or more frequencies according to the periodicity.

* * * * *